(12) United States Patent
Miller (10) Patent No.: US 8,955,206 B2
(45) Date of Patent: Feb. 17, 2015

(54) METHOD AND APPARATUS FOR CREATING A LAYUP OF REINFORCING FIBERS

(75) Inventor: Jeffrey L. Miller, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 712 days.

(21) Appl. No.: 13/267,875

(22) Filed: Oct. 6, 2011

(65) Prior Publication Data

US 2013/0014372 A1    Jan. 17, 2013

Related U.S. Application Data

(60) Provisional application No. 61/507,115, filed on Jul. 12, 2011.

(51) Int. Cl.
| | |
|---|---|
| B21D 51/00 | (2006.01) |
| B29C 70/38 | (2006.01) |
| B29C 70/32 | (2006.01) |
| B29C 70/86 | (2006.01) |
| B29D 99/00 | (2010.01) |
| B29C 70/08 | (2006.01) |
| C22C 47/20 | (2006.01) |
| B23P 6/00 | (2006.01) |
| B29L 31/30 | (2006.01) |
| B64F 5/00 | (2006.01) |
| B64C 1/00 | (2006.01) |

(52) U.S. Cl.
CPC .............. B29C 70/382 (2013.01); B29C 70/32 (2013.01); B29C 70/326 (2013.01); C22C 47/20 (2013.01); B23P 6/002 (2013.01); B29C 70/386 (2013.01); B29C 70/865 (2013.01); B29D 99/0021 (2013.01); B29C 70/088 (2013.01); B29L 2031/3082 (2013.01); B64F 5/0081 (2013.01); B64C 2001/0072 (2013.01); Y02T 50/433 (2013.01); Y02T 50/43 (2013.01)
USPC ........ 29/419.1; 29/889.7; 29/402.09; 29/820; 156/173; 156/425

(58) Field of Classification Search
CPC ......... B23P 6/002; C22C 47/20; B29C 70/32; B29C 70/326
USPC ................ 29/889.7, 889.71, 402.08, 402.09, 29/419.1; 242/438, 443, 447; 156/173
See application file for complete search history.

(56) References Cited

U.S. PATENT DOCUMENTS

| | | | |
|---|---|---|---|
| 3,143,306 | A | 8/1964 | Dijkmans |
| 4,175,992 | A * | 11/1979 | Grawey .................... 156/143 |
| 5,074,948 | A | 12/1991 | Greffioz et al. |
| 5,458,943 | A * | 10/1995 | Taylor ........................ 428/34 |
| 6,168,358 | B1 | 1/2001 | Engwall et al. |
| 6,692,681 | B1 | 2/2004 | Lunde |
| 7,080,441 | B2 | 7/2006 | Braun |
| 7,282,107 | B2 | 10/2007 | Johnson et al. |
| 7,459,048 | B2 | 12/2008 | Pham et al. |

(Continued)

FOREIGN PATENT DOCUMENTS

| | | |
|---|---|---|
| FR | 2953754 A1 | 6/2011 |
| WO | 2007148301 A2 | 12/2007 |

*Primary Examiner* — Jermie Cozart
(74) *Attorney, Agent, or Firm* — Hugh P. Gortler (57) ABSTRACT

A method for creating a layup of reinforcing fibers comprises mounting a face sheet to a spindle of a mandrel tool support, the face sheet having a layup surface for the reinforcing fibers, and counterbalancing the mounted face sheet for stiffness and center of balance.

20 Claims, 9 Drawing Sheets

(56) References Cited

U.S. PATENT DOCUMENTS

| | | |
|---|---|---|
| 7,913,390 B2 | 3/2011 | Masters et al. |
| 7,935,289 B2 | 5/2011 | Anderson |
| 8,714,226 B2 | 5/2014 | Senibi |
| 2006/0096700 A1* | 5/2006 | Clark et al. ............... 156/195 |
| 2009/0139641 A1* | 6/2009 | Chapman et al. ........... 156/242 |
| 2010/0032862 A1 | 2/2010 | Micheaux |

* cited by examiner

METHOD AND APPARATUS FOR CREATING A LAYUP OF REINFORCING FIBERS

This application claims the benefit of provisional application 61/507,115 filed Jul. 12, 2011.

BACKGROUND

Commercial aircraft may be damaged by bird strikes, ground handling equipment, debris, hail and other unplanned events. These events can result in holes and tears in aircraft skin, and damage to underlying stiffening substructure (e.g., frames, stiffeners and pad-ups). For instance, an aircraft's nose cab section may be damaged by a bird strike, a lower lobe may be damaged due to nose gear collapse, mid-section door surrounds may be damaged due to collisions with ground handling equipment, an end section lower lobe may be damaged by a tail strike, etc.

It is important to repair a damaged aircraft and return it to service as quickly as possible. Down time is very costly to an aircraft carrier, as an idle aircraft results in lost revenue.

Repair of a panelized aluminum aircraft is relatively straightforward. A damaged panel and underlying substructure are removed from the aircraft and replaced. If panels are available, the repair can be implemented relatively quickly.

Repair of composite commercial aircraft is not so straightforward, especially for large area repairs of one-piece components. Consider a fuselage made up of several one-piece composite barrel sections. Each barrel section includes skin, hoop frames, and stiffeners (e.g., stringers). The stiffeners may be integrated with the skin (by co-curing during fabrication). The hoop frames may be mechanically fastened to the skin. If a large area of a fuselage section becomes damaged, removing and replacing the entire barrel section would be prohibitively expensive, disruptive to production, and time consuming.

An infrastructure for large area repair of one-piece composite aircraft components is needed.

SUMMARY

According to an embodiment herein, a method for creating a layup of reinforcing fibers comprises mounting a face sheet to a spindle of a mandrel tool support, the face sheet having a layup surface for the reinforcing fibers, and counterbalancing the mounted face sheet for stiffness and center of balance.

According to another embodiment herein, a method comprises forming different layups of reinforcing fibers using a single spindle of a mandrel tool support, wherein forming each layup includes mounting a corresponding face sheet to the spindle, and counterbalancing the mounted face sheet.

According to another embodiment herein, apparatus for creating different layups of composite material comprises a spindle, and a plurality of face sheets having different layout configurations. Each face sheet is mechanically fastenable to attach points on the spindle. The apparatus further comprises means for counterbalancing a face sheet that is mechanically fastened to the spindle.

DETAILED DESCRIPTION

A rotary mandrel tool support may be used to manufacture composite parts made of layers or plies of reinforcing fibers embedded in a matrix. One example of a composite is carbon fiber reinforced plastic (CFRP), where the constituents include carbon fibers embedded in an epoxy matrix. During manufacture, the support is used to rotate a mandrel tool, while reinforcing fibers are deposited on a layup surface of the mandrel tool. The fibers may be deposited by an automated tape laying (ATL) or automated fiber placement (AFP) machine, or they may be deposited manually. Full fabric plies may also be incorporated into the layup. These full plies may be placed manually or automatically. For example, the layup may include an initial fabric ply and final fabric ply.

A mandrel tool herein includes a face sheet, which provides the layup surface. The face sheet may have integral stiffening through its thickness, or it may have a backing support for stiffening. The face sheet may be metallic (e.g. invar, steel, aluminum), or composite, or a hybrid.

Figure 1:
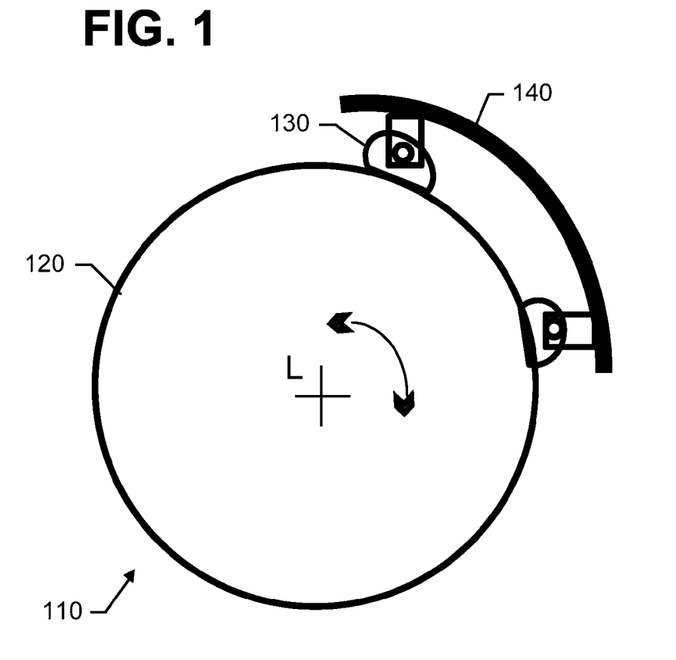
FIGS. 1 and 2 are illustrations of different face sheets mounted to a spindle of a rotary mandrel tool support.

Reference is now made to FIG. 1, which illustrates a rotary support 110 including a spindle 120. The spindle 120 is rotatable about its longitudinal axis (L). The spindle 120 is not limited to any particular geometry. Examples of spindle geometries include but are not limited to cylinders, rectangular prisms, and prisms having non-rectangular cross-sections.

The spindle 120 has attach points 130 for mounting a range of tooling face sheets 140. Different face sheets 140 may have different diameters, lengths, layup surface contours, arc lengths, radii, weight, etc.

Two attachment points 130 are illustrated in FIG. 1. Additional pairs of attachment points 130 may be provided along the length of the spindle 120.

The face sheet 140 shown in FIG. 1 has roughly the same diameter as the spindle 120. It may be mounted directly to the spindle 120. For example, the spindle is three feet in diameter, and the effective diameter of the face sheet is four feet in diameter, with five inches of stiffening structure on the face sheet 140. In this example, the face sheet 140 may be directly attached to the spindle 120.

Figure 2:
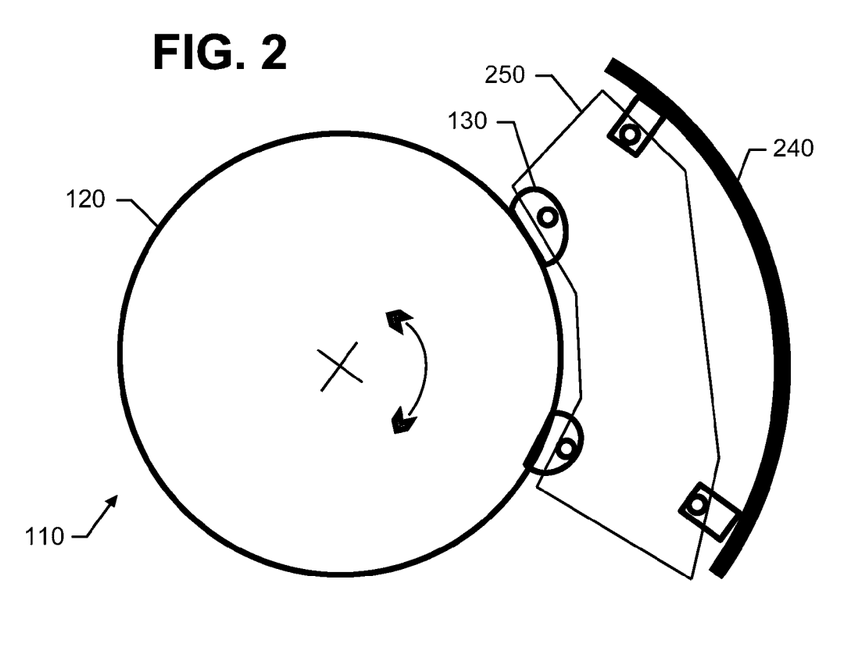

FIG. 2 shows a face sheet 240 having a larger diameter than the spindle 120. An adapter substructure 250 is used to mount the face sheet 240 to the attach points 130 on the spindle 120. The adapter substructure 250 may include elements such as plates or tubes, which are sized according to the spindle diameter and relative diameter of face sheet 140.

The face sheet 140 is in the appropriate orientation for rotary-type automated fiber placement or tape laydown operations. The face sheet 140 may be spaced apart from the spindle 120. Generally, for a cylindrical or round geometry, the face sheet 140 will be at the same centerline distance from the center of the spindle 120 as its radius to facilitate machine motion. The face sheet 140 will be spaced apart from the spindle 120 if it is larger than the outer surface of the spindle 110.

In some embodiments, the attach points 130 may include tabs with through holes, or tabs with tapped holes on the spindle 120. The face sheet 140 may utilize a similar set of attach points or tabs can be directly fastened (mechanically, for example, by bolts or pins) to the spindle 120. The mechanical fastening allows the face sheet 140 to be easily attached to and removed from the spindle 140.

Figure 3A:
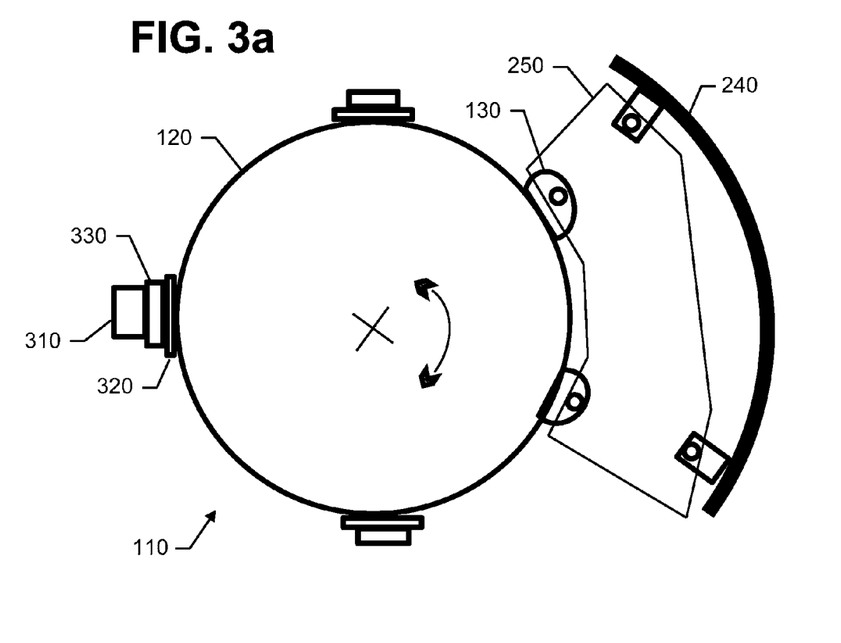
FIGS. 3a and 3b are illustrations of a spindle with counterbalancing.
Figure 3B:
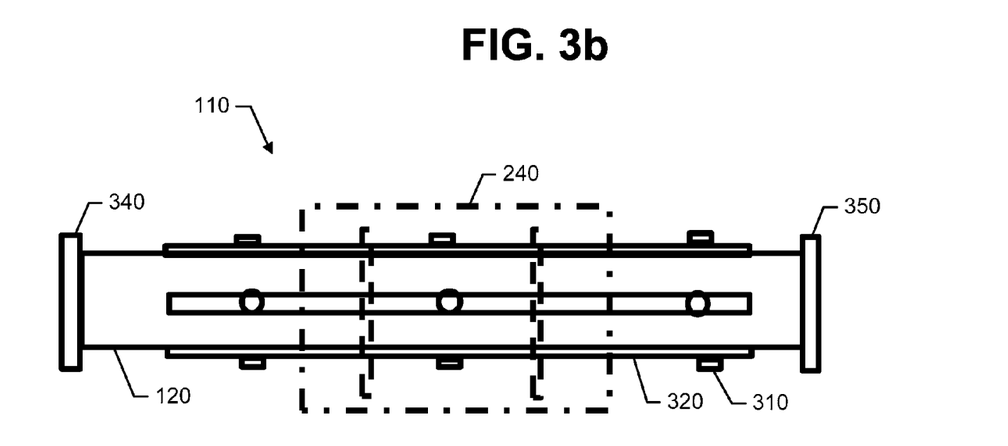

Reference is now made to FIGS. 3a and 3b. The rotary support 110 further includes an adjustable counterbalance system for adjusting stiffness and support balance requirements (e.g., center of mass) to accommodate the mounted face sheet. Counterbalance weights 310 may be added to and removed from the spindle 120 via attach plates 320. Spacers 330 may be located between the weights 310 and attach plates 320. The spacers 330 may be used to increase the distance of the weights 310 from the center of the spindle 120 for additional moment. Considerations for counterbalancing include tool/layup weight, spindle length, location of the face sheet on the spindle 120, and spindle deflection.

Prior to performing the counterbalancing, the center of mass of the face sheet 240 and the adapter substructure 250 (shown in phantom in FIG. 3b) may be determined. The center of mass may be determined with computer aided design (CAD) software. A center of mass may then be calculated for the weights 310, plates 320, and spacers 330. From these calculations, the amounts and locations of the weights 310, plates 320 and spacers 330 may be estimated.

There are several ways of supporting the spindle 120 while the counterbalancing is being performed. As one example, the spindle 120 is rotated between a headstock and tailstock of an ATL or AFP machine. The positions of the weights 310 are adjusted so rotation of the spindle 120 can be initiated with minimal force and the spindle 120 can thereafter spin freely without imbalance. Balance conditions are verified to ensure rotational equilibrium within capabilities of the ATL or AFP machine.

Figure 4:
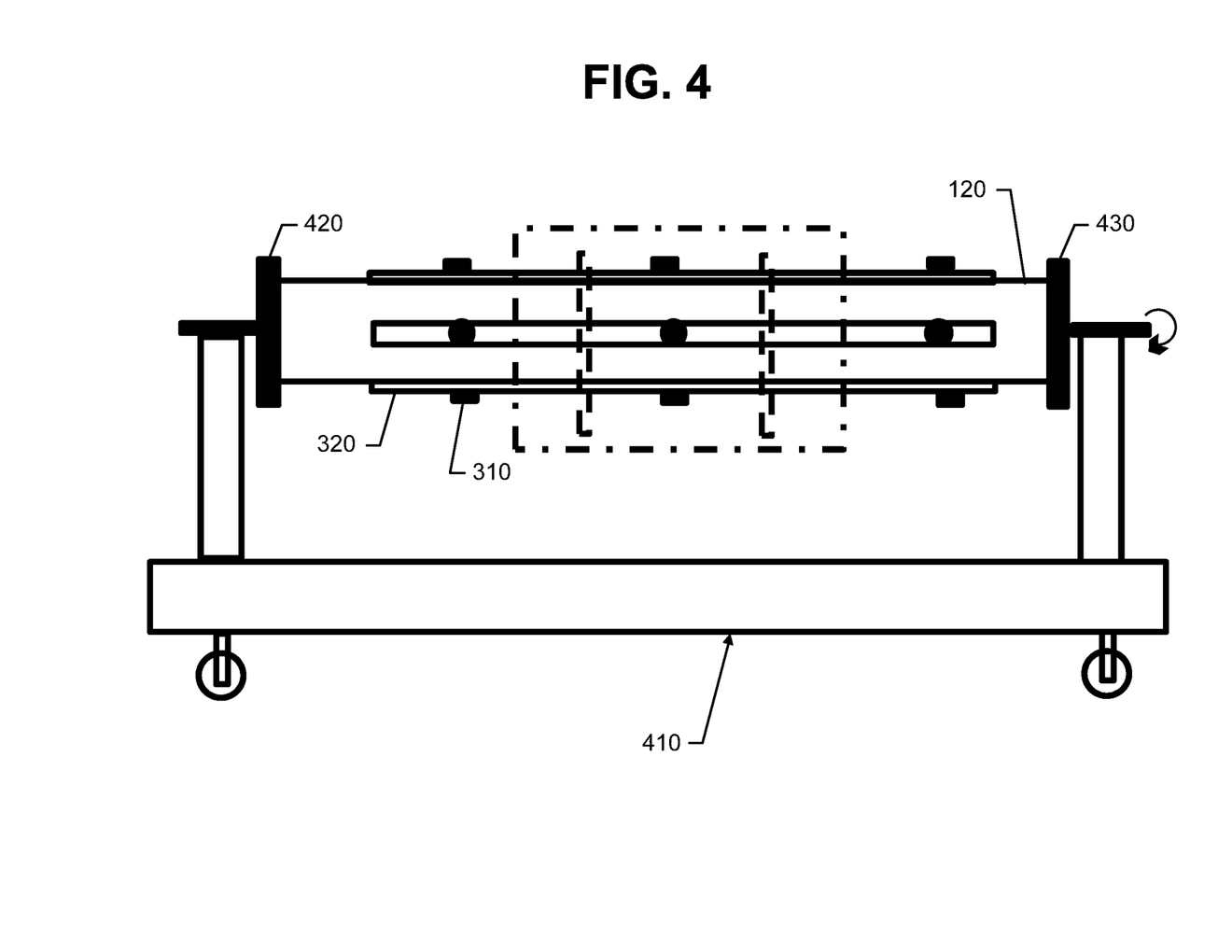
FIG. 4 is an illustration of a cart for supporting the spindle during counterbalancing.

Reference is now made to FIG. 4, which illustrates a second example: the spindle 120 is supported by a cart 410 while the counterbalancing is performed. The cart 410 includes a headstock 420 and tailstock 430 for rotating the spindle 120 during counterbalancing. The cart 410 offers several advantages, which will be described below.

Figure 5:
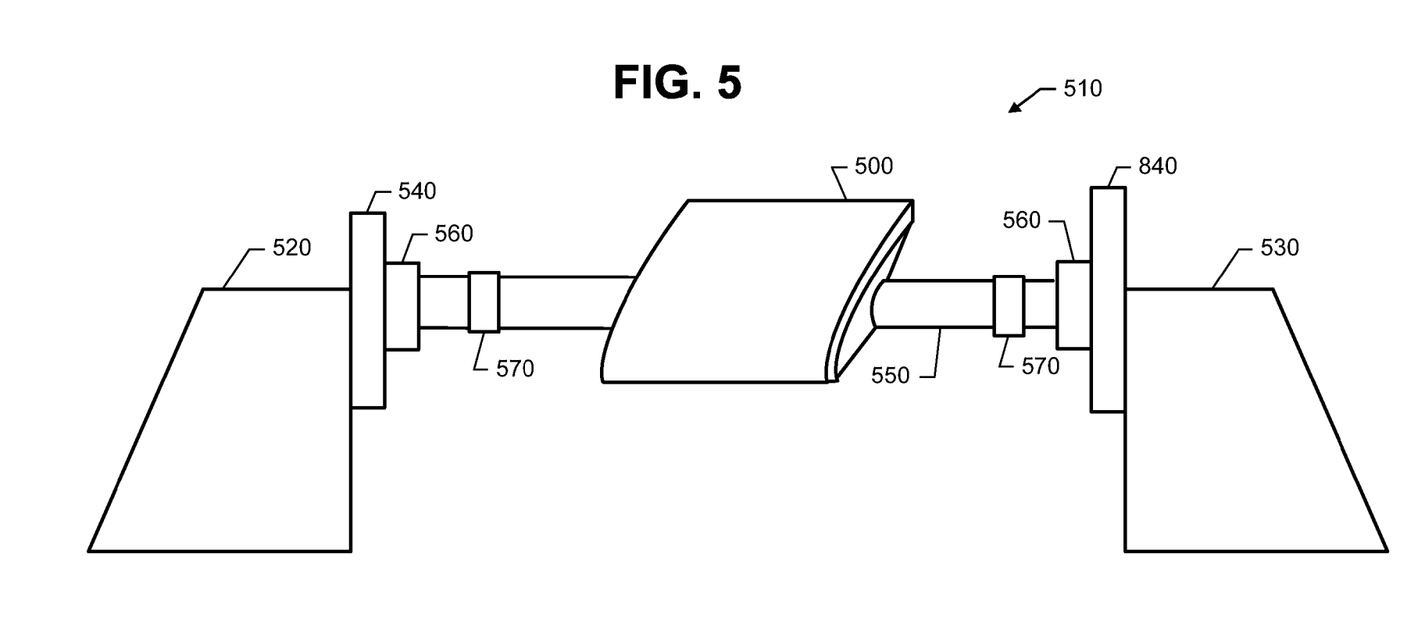
FIG. 5 is an illustration of an example of a rotary mandrel tool support.

Reference is now made to FIG. 5, which illustrates an embodiment of a rotary support 510 that is supported by headstock 520, tailstock 530 of an AFP machine. The rotary support 510 includes a spindle 550, which may be removably mounted to rotating face plates 540 by bolted attachment plates 560. The headstock 520 and tailstock 530 support the weight of the spindle 120, the mounted face sheet 500, counterbalance weights (not shown), and reinforcing fibers applied by the AFP machine. The headstock 520 and the tailstock 530 also provide the necessary torque to rotate the spindle 550.

The spindle 550 may have a length adjustment mechanism 570 for varying spindle length. For example, the length adjustment mechanism 570 may include a telescoping mechanism, or it may include spacers or segments that are added or removed to achieve a desired length. The spindle length may be adjusted to accommodate face sheets of different lengths, depending on the size of the work envelope (i.e., distance between the headstock 520 and the tailstock 530). In some embodiments, the AFP work envelope may range from approximately 10 feet to 50 feet.

In some embodiments, a spindle herein does not have a length adjustment mechanism. Instead, the spindle may be fixed at a maximum length that depends upon the AFP work envelope.

In some embodiments, the spindle 550 may be readily removed and re-installed with a simple mechanism to pickup up center of rotation of the rotating faceplates 540. In some embodiments, the spindle 550 may be lifted from above with an overhead crane (e.g., ceiling crane, portable gantry crane, jib crane) or with a spreader bar (for a single or point lift or a dual point at the ends). In other embodiments, the spindle 550 may be lifted from below with a dolly or cart capable of performing the load transfer.

A rotary support herein allows a single spindle to be used for a range of different face sheets. The different face sheets, in turn, allow for a range of layup sizes. For instance, the layups may range from 3 ft×3 ft to upwards of 42 ft×20 ft. Advantageously, a layup of different sizes and/or contour may be created by simply replacing a face sheet and performing counterbalancing for stiffness and center of mass to satisfy machine balance requirements.

Figure 6:
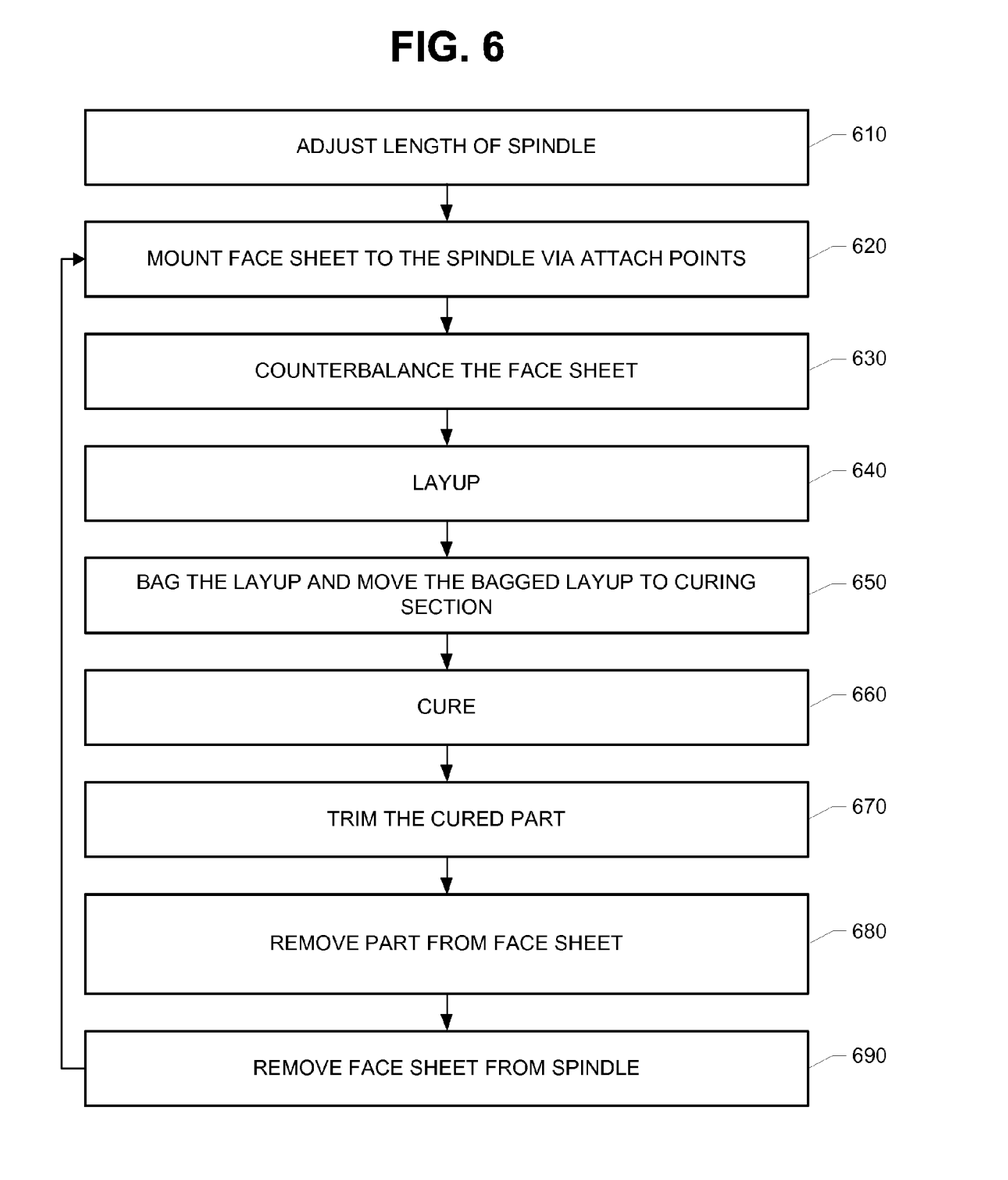
FIG. 6 is an illustration of a method of using the mandrel tool support to fabricate a composite part.

FIG. 6 is an illustration of a method of using the rotary mandrel tool to create different composite layups. At block 610, length of the spindle is adjusted. At block 620, a face sheet is mounted to the spindle via attach points.

At block 630, the face sheet is counterbalanced for stiffness and center of balance to satisfy balance requirements of the support with respect to the machine that deposits the reinforcing fibers. Consider an AFP machine. Typical natural frequencies of the total rotating assembly (including spindle, spacers and the mounted faced sheet) may be approximately 2-8 Hz. The minimum required natural frequency is typically provided by the AFP manufacturer. Typical AFP rotation speeds may be between 3-9 rpm, relatively slow, but depending diameter, providing surface motion approximately between 50-5000 inch/min, with AFP laydown typically less than 3000 inch/min. The total weight of the assembly (spindle, attachment, counter balance, face sheet) falls within the allowable limits of the AFP machine (e.g. 50,000-200,000 lbs).

The counterbalancing provides proper balance to match the torque capabilities of the AFP machine. An unbalanced tool may be difficult to position accurately and cause motor tuning challenges or undesirable vibration during rotation. The counterbalance adjustments are performed to balance the tool about its center to minimize vibration and operate within the limits of the AFP machine.

The counterbalancing also provides proper stiffness to minimize deflection of the total rotating assembly (including the spindle, spacers and mounted face sheet). Insufficient stiffness may cause positioning errors during tow placement. For instance, insufficient stiffness may result in sag with maximum deflection expected toward the midpoint of the spindle.

At block 640, composite material for a composite part is laid up on the layup surface of the face sheet as the face sheet is rotated. The fiber layup may be performed automatically (for example, by AFP or ATL) or manually. Caul plates may then placed on the part layup. For typical automated fiber placement material, typical material widths of $\frac{1}{8}$", $\frac{1}{4}$", and $\frac{1}{2}$" may be used. For hand layup and automated tape layup, wider tapes of 3", 6", and 12" may be used. Machines that perform automated layup may be dedicated machines or by end effectors that are moved by end effector positioning systems.

At block 650, the layup is bagged, and moved to a curing section. In some embodiments, the layup may be bagged to the face sheet, the spindle may be removed from the headstock and tailstock, and the entire spindle and face sheet may be moved into an autoclave or oven for cure. The spindle may be removed by a separate support fixture such as the cart 410. The cart 410 can withstand autoclave temperatures and pressures.

In other embodiments, the face sheet may be dismounted from the spindle, the layup may be bagged to the face sheet, and the face sheet is moved to the curing section. The face sheet may be transported by an autoclave-rated dolly or table.

At block 660, the composite material for the part is cured in the curing section. As examples, the cure may be autoclave cure, oven cure, or out of autoclave cure (depending on the composite material system selected for the part). At block 670, machining (e.g., trimming and drilling) of the cured part is performed.

At block 680, following trimming and drilling, the finished part is removed from the face sheet. A relatively large part may be removed with a lifting fixture. The finished part is placed on an NDI fixture to enable ultrasonic inspection.

At block 690, the face sheet is removed from the spindle, and a face sheet for the new part is mounted to the spindle (block 620). The functions at blocks 630 to 680 are repeated to fabricate the new part.

A rotary support herein is especially useful for repairing a new class of commercial aircraft. This new class of aircraft includes large one-piece sections made of composite material.

Figure 7:
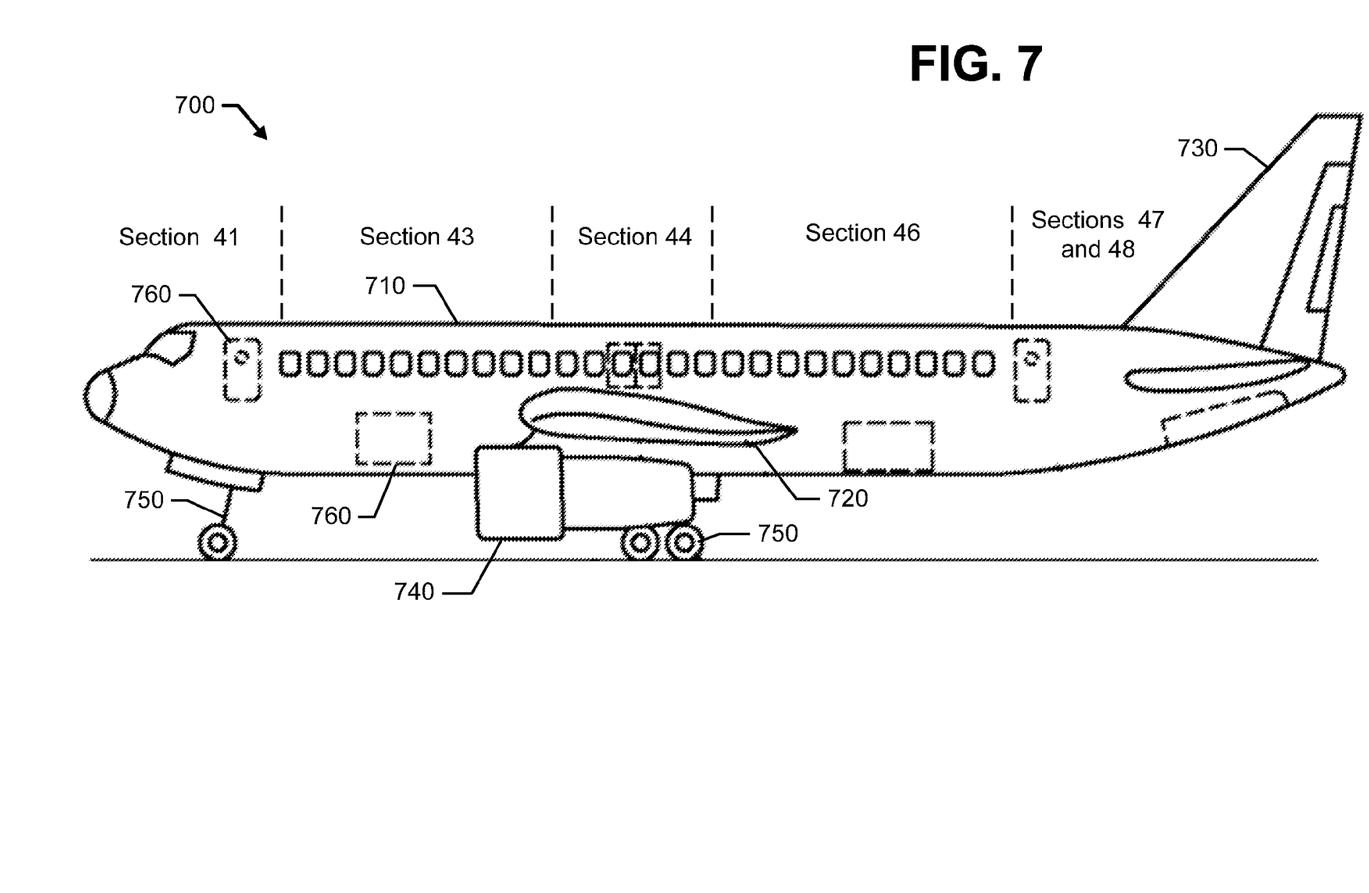
FIG. 7 is an illustration of an aircraft including a composite fuselage.

Reference is made to FIG. 7, which illustrates an example of a composite aircraft 700. The aircraft 700 generally includes a fuselage 710, wing assemblies 720, and empennage 730. One or more propulsion units 740 are coupled to the fuselage 710, wing assemblies 720 or other portions of the aircraft 700. Landing gear assemblies 750 are coupled to the fuselage 710.

In some embodiments, the entire fuselage 710 may be made of a single one-piece composite section. In other embodiments, the fuselage 710 may be formed by multiple one-piece composite sections. In the example illustrated in FIG. 7, the fuselage 710 is formed from six one-piece composite barrel sections: a nose cab section (section 41), three mid sections (sections 43, 44 and 46), and end sections (section 47 and 48).

Passenger and cargo doors 760 are formed in all sections. Thus, all sections are susceptible to damage from ground handling equipment. All sections are also susceptible to damage from ground debris. The nose cab section is also susceptible to damage from bird strikes, which are high energy impacts. A lower lobe of the nose cab section is susceptible to damage due to nose gear collapse. A lower lobe of the end section is susceptible to damage by tail strikes.

Figure 8:
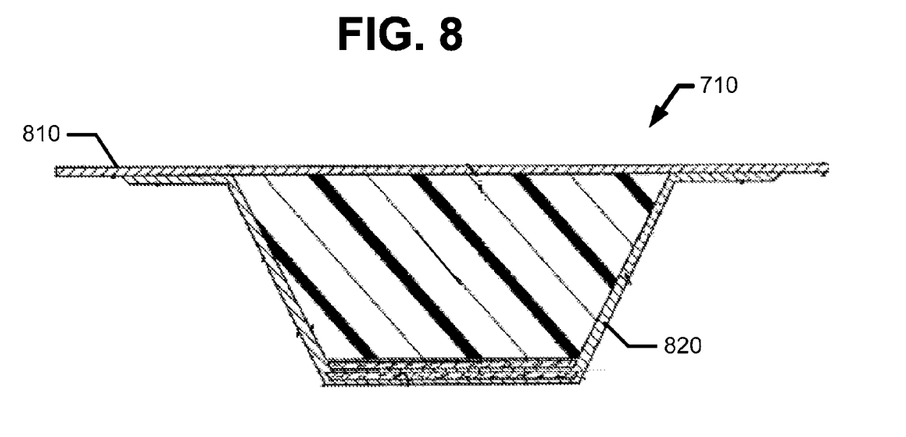
FIG. 8 is an illustration of skin and underlying stiffening substructure of a composite barrel section of the fuselage.
Figure 9:
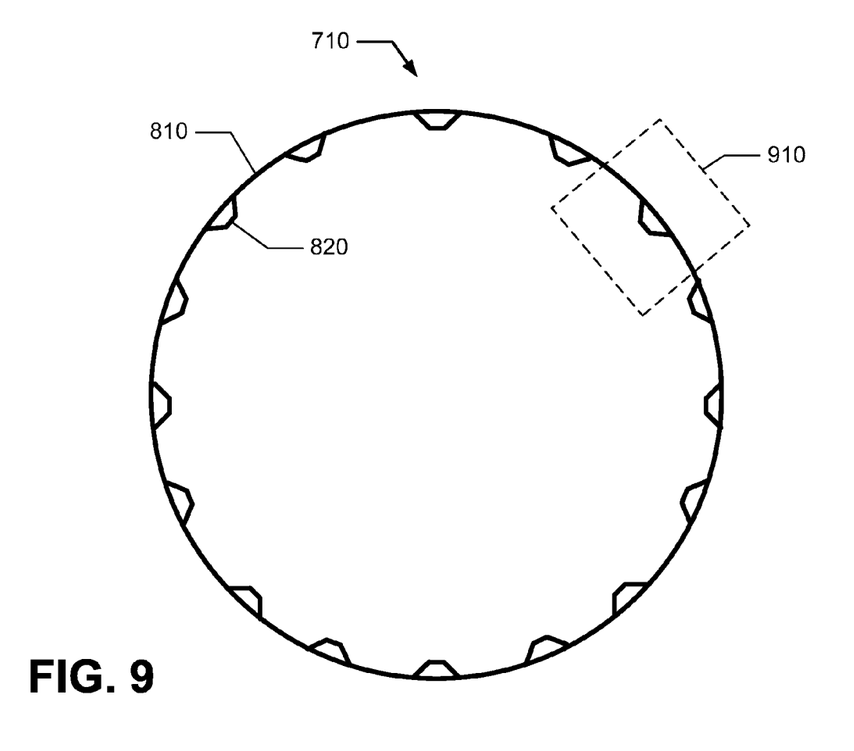
FIG. 9 is an illustration of a damaged area of a one-piece fuselage barrel.

Reference is now made to FIGS. 8 and 9, which illustrate a randomly damaged area 910 of the fuselage 710. In addition to damage to the skin 810, the underlying integrated stiffening substructure 820 may also be damaged. The stiffening substructure may include longitudinally-extending stringers 820, which are co-cured with the skin 810.

In a large commercial aircraft, it is far more desirable to replace the damaged area than replace an entire one-piece barrel. Still, the damaged area will usually be random. That is, the location, exact size, and extent of the damage may vary from incident to incident. Consequently, a pre-fabricated panel might not fit well, or at all, into a damaged area.

Advantageously, a rotary support herein may be used to fabricate panels that are customized to replace the damaged area. The only structure that changes from replacement panel to replacement panel is the face sheet. For each new configuration of a panel, only a face sheet is fabricated. The face sheet is then mounted to the rotary support and counterbalanced.

Fabrication speed and cost is reduced because only a face sheet need be attached and counterbalanced. Cost is also reduced because, unlike conventional supports, the spindles are not integrated with the mandrel tools and, therefore, may be reused. A standard-sized support or even oversized support may accommodate a wide range of face sheet sizes. Replacement panels will vary in size. They may be larger than a 42'×20' replacement panel, or no larger than a 3'×3' replacement panel.

Figure 10:
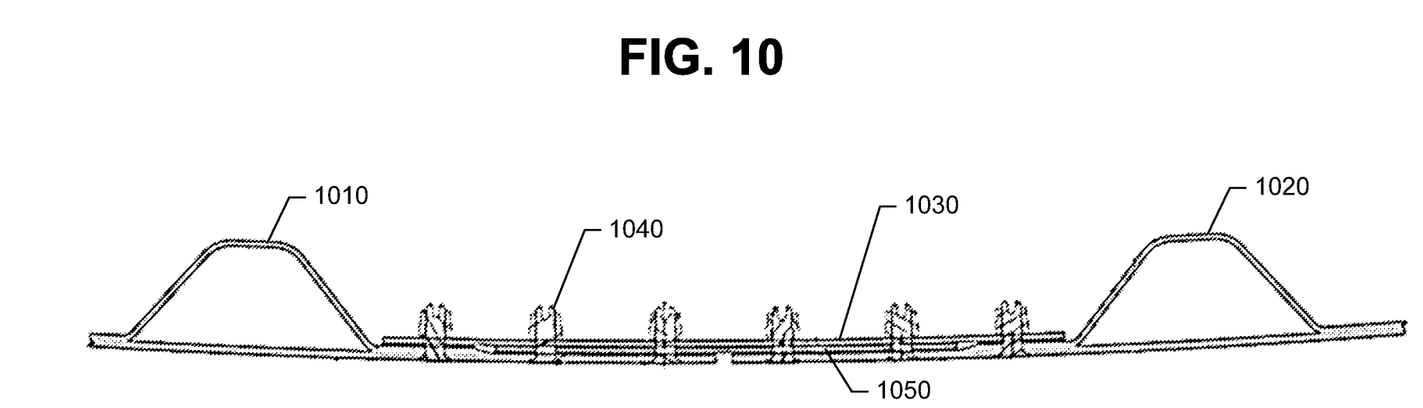
FIG. 10 is an illustration of a replacement panel that is attached to a skin panel via a bolted splice.

Reference is made to FIG. 10, which illustrates a replacement panel 1010 that is attached to a skin panel 1020 via a bolted splice. The bolted splice includes a doubler 1030 that is attached to both the replacement panel 1010 and the skin panel 1020 by bolts 1040. Non-structural filler 1050 may be used to fill gaps between the doubler 1030 and the replacement panel 1010 or skin panel 1020. The splices generally have circumferential, longitudinal, and corner configurations. A rotary support herein may be used to fabricate the doublers 1030 and fillers 1050.

Figure 11:
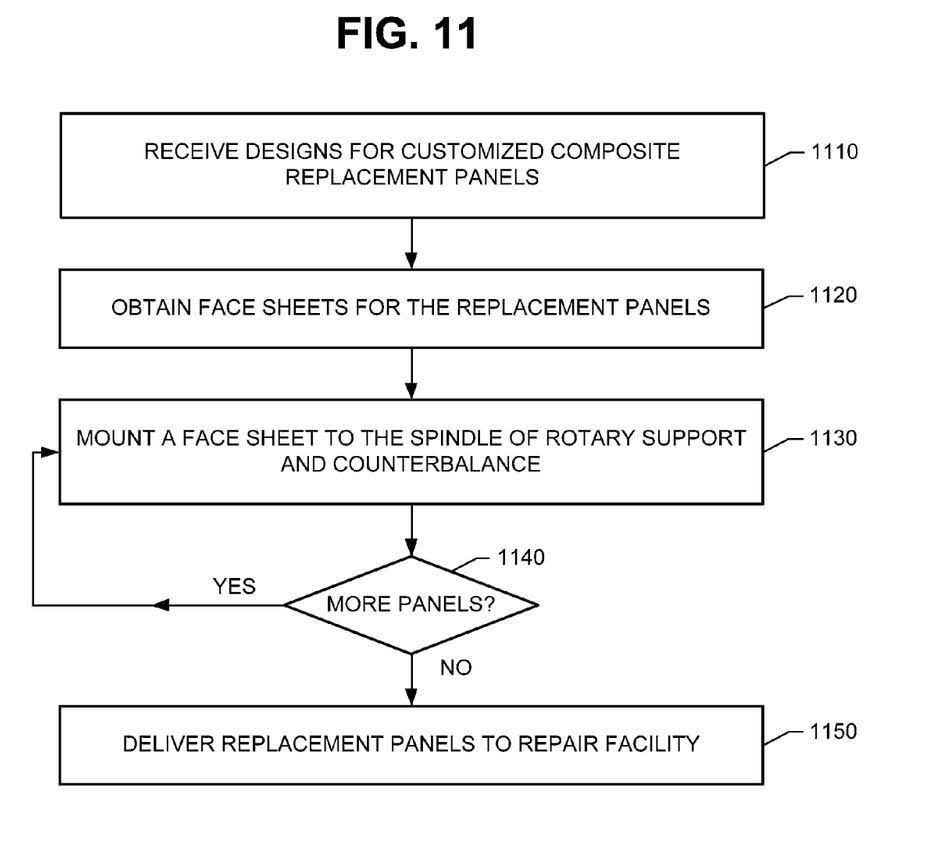
FIG. 11 is an illustration of a method for repairing a damaged one-piece composite component of an aircraft.

Reference is now made to FIG. 11, which illustrates a method of using a rotary support herein to create custom one-piece composite replacement panels for different damaged areas of an aircraft. At block 1110, a design is received for each customized composite replacement panel. Each design may include a detail panel definition for skin and integrated stiffening substructure. This may include creating a detail panel definition based on skin and substructure that were originally used in the section, and modifying the original panel definition so the replacement panel can replace the damaged area and match the contour of the damaged area. Creating the panel definition includes creating an engineering geometry including ply boundaries, stacking sequence, fiber composition and orientations, and tape widths within each boundary.

The design may also includes a detail panel definition for mechanical fastening elements (e.g., splice doublers and fillers), which will be used to mechanically fasten the replacement panel to the aircraft. Since the exact location of the damaged material and the exact extent of the damage is random and unpredictable, the splice joint configuration and details for the repair are likely not to exist and need to be created. The number of detail panels depends on size and complexity of the repair. In a complex repair, for instance, dozens of splice doublers and thousands of fasteners might be involved. This phase of design is unique to the damage.

At block 1120, face sheets for the replacement panel layups are obtained. In some instances, some or all of the face sheets may be fabricated according to the designs. In other instances, some or all of the face sheets may be excised from tagged production tools or defective production tools. Portions of the tagged tools may be cut away, and those portions are used as face sheets.

At block 1130, a face sheet is mounted to the spindle and counterbalanced, and the rotary support is used to fabricate the replacement panel. The panel fabrication includes part layup, curing, machining, etc. Nondestructive inspection may be performed.

At block 1140, if an additional part having a different configuration is to be fabricated, the face sheet is removed from the spindle. Another face sheet is mounted and counterbalanced, and the additional panel is fabricated (block 1130).

At block 1150, the replacement panels are shipped to a repair facility. There, the replacement panels are installed in the damaged aircraft.

The invention claimed is:

1. A method for creating a layup of reinforcing fibers, the method comprising:
   mounting a face sheet to a spindle of a mandrel tool support, the face sheet having a layup surface for the reinforcing fibers; and
   counterbalancing the mounted face sheet for stiffness and center of balance.

2. The method of claim 1, wherein the mounting includes fastening the face sheet to the spindle at discrete attachment points along a length of the spindle.

3. The method of claim 1, wherein the counterbalancing includes attaching weights with spacers to the spindle.

4. The method of claim 3, wherein the counterbalancing further includes verifying balance conditions are satisfied to ensure rotational equilibrium within capabilities of a machine that will deposit the reinforcing fibers on the face sheet.

5. The method of claim 1, wherein the spindle and attached face sheet are counterbalanced on a mobile cart.

6. The method of claim 1, further comprising adjusting length of the spindle prior to mounting the face sheet.

7. The method of claim 1, further comprising rotating the mounted face sheet while depositing reinforcing fibers on the layup surface.

8. The method of claim 7, further comprising removing the spindle from the mandrel tool support after part layup; and transporting the spindle, along with the mounted face sheet and layup, to a curing section.

9. The method of claim 7, further comprising removing the face sheet from the spindle, mounting a second face sheet having a different layup configuration; and counterbalancing the second face sheet.

10. The method of claim 1, wherein a plurality of face sheets having different layup configurations are serially mounted to the spindle, counterbalanced and used for composite part fabrication.

11. The method of claim 10, wherein the parts include composite replacement panels for aircraft.

12. A method comprising forming different layups of reinforcing fibers on a plurality of face sheets having different layup configurations using a single spindle of a mandrel tool support, wherein each face sheet is mounted to the spindle, counterbalanced, and used to form one of the different layups.

13. The method of claim 12, further comprising rotating the spindle while depositing the reinforcing fibers on the mounted face sheet.

14. The method of claim 13, further comprising removing the spindle from the mandrel tool support after part layup; and transporting the spindle, along with the mounted face sheet and layup, to a curing section.

15. The method of claim 12, wherein the counterbalancing includes attaching weights with spacers to the spindle; and verifying balance conditions are satisfied to ensure rotational equilibrium within capabilities of a machine that will deposit reinforcing fibers on the mounted face sheet.

16. Apparatus for creating different layups of composite material, the apparatus comprising:
   a spindle having attach points;
   a plurality of face sheets having different layout configurations, each face sheet mechanically fastenable to the attach points; and
   means for counterbalancing a face sheet that is mechanically fastened to the spindle.

17. The apparatus of claim 16, wherein the spindle has a variable length.

18. The apparatus of claim 16, further comprising a machine for depositing reinforcing fibers on the layup surface of the face sheet mounted to the spindle.

19. The apparatus of claim 16, wherein the counterbalancing means includes weights and spacers.

20. The apparatus of claim 16, further comprising a headstock and tailstock for supporting and rotating the spindle, wherein the spindle is removable from the headstock and the tailstock.

* * * * *